United States Patent [19]
Dariano

[11] Patent Number: 5,173,896
[45] Date of Patent: Dec. 22, 1992

[54] T-CARRIER NETWORK SIMULATOR

[75] Inventor: Michael A. Dariano, Deptford, N.J.

[73] Assignee: Bell Atlantic Network Services, Inc., Arlington, Va.

[21] Appl. No.: 620,125

[22] Filed: Nov. 30, 1990

[51] Int. Cl.$^5$ .............................................. H04J 1/16
[52] U.S. Cl. ......................................... 370/13; 379/21
[58] Field of Search ........................... 370/13, 17, 14; 371/15.1, 20.1; 379/1, 21

[56] References Cited

U.S. PATENT DOCUMENTS

| | | |
|---|---|---|
| 3,840,708 | 10/1974 | Clark . |
| 4,091,550 | 5/1978 | Schrenk . |
| 4,161,627 | 7/1979 | Amann . |
| 4,220,833 | 9/1980 | Wert ................................... 370/13.1 |
| 4,259,077 | 3/1981 | Keweza . |
| 4,301,882 | 1/1982 | Johner et al. ......................... 370/13 |
| 4,623,312 | 11/1986 | Crawford . |
| 4,663,775 | 5/1987 | Olek . |
| 4,825,434 | 4/1989 | Shaio ................................... 370/80 |
| 4,829,244 | 5/1989 | Tom et al. ............................ 370/13 |
| 4,852,093 | 7/1989 | Koeppe . |
| 4,887,071 | 12/1989 | Virdee . |
| 4,943,238 | 7/1990 | Gregorio . |
| 5,029,204 | 7/1991 | Shenoi ................................ 370/32.1 |

Primary Examiner—Douglas W. Olms
Assistant Examiner—T. Samuel
Attorney, Agent, or Firm—Lowe, Price, LeBlanc & Becker

[57] ABSTRACT

A portable self-contained T-carrier network simulating device including multiple modules which are removably mounted and connected and include a first customer premise simulation which includes an actual network smart jack and a repeater, a first T-carrier link simulation which provides conductive isolation between the ends thereof, bipolar violation removal and signal level change control to simulate a fiber link, a switching office simulation including an actual network digital signal cross-connect frame (DSX) and repeater, a second T-carrier link simulation which comprises wire T-carrier link simulation including an actual manhole repeater and line reversal device and also includes a simulation of bridge tap which is accessible from the front panel to simulate variation in the effect of positioning of the bridge tap, and a second customer premise simulation which includes an actual network smart jack and CPE jack.

20 Claims, 6 Drawing Sheets

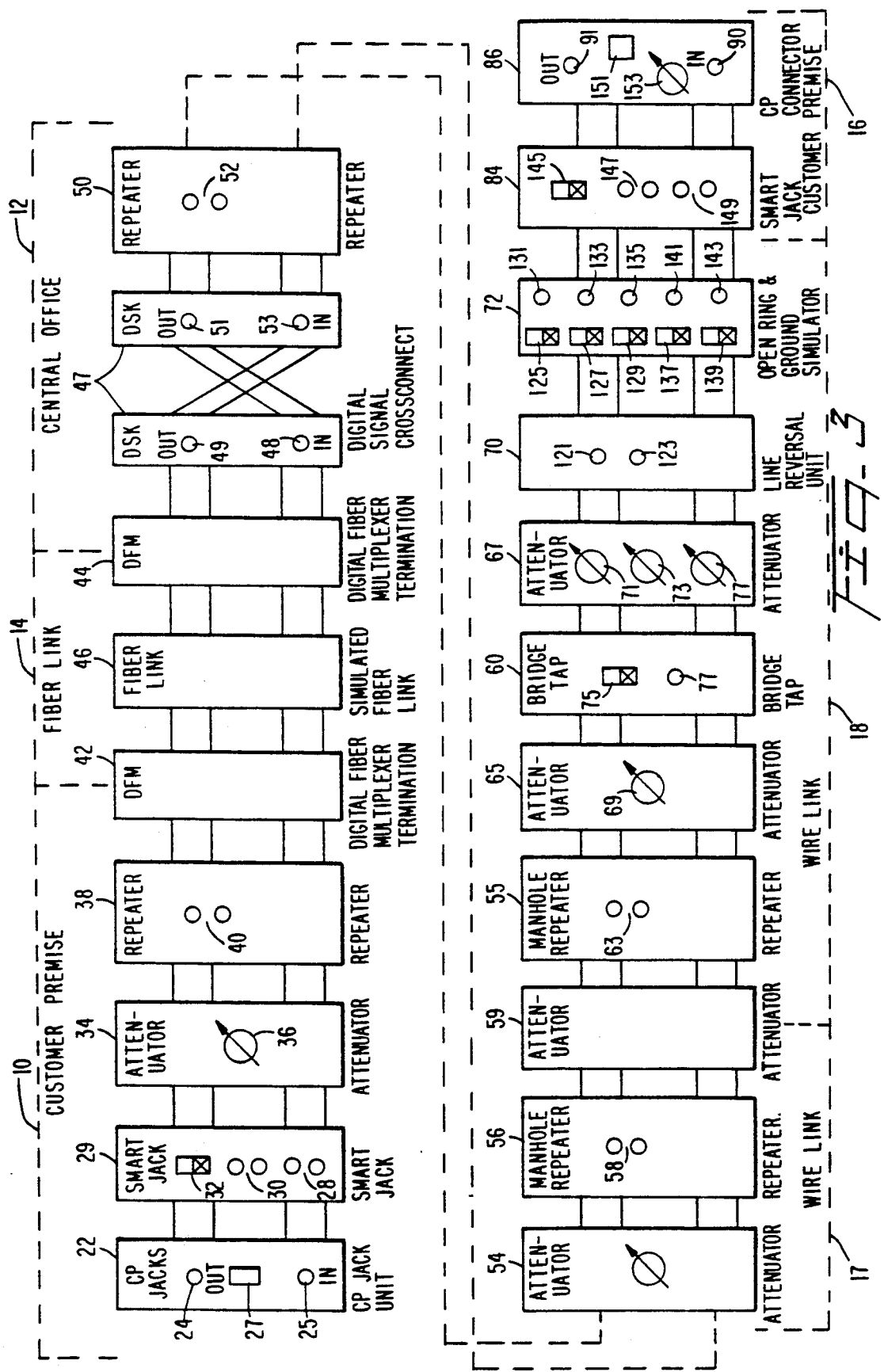

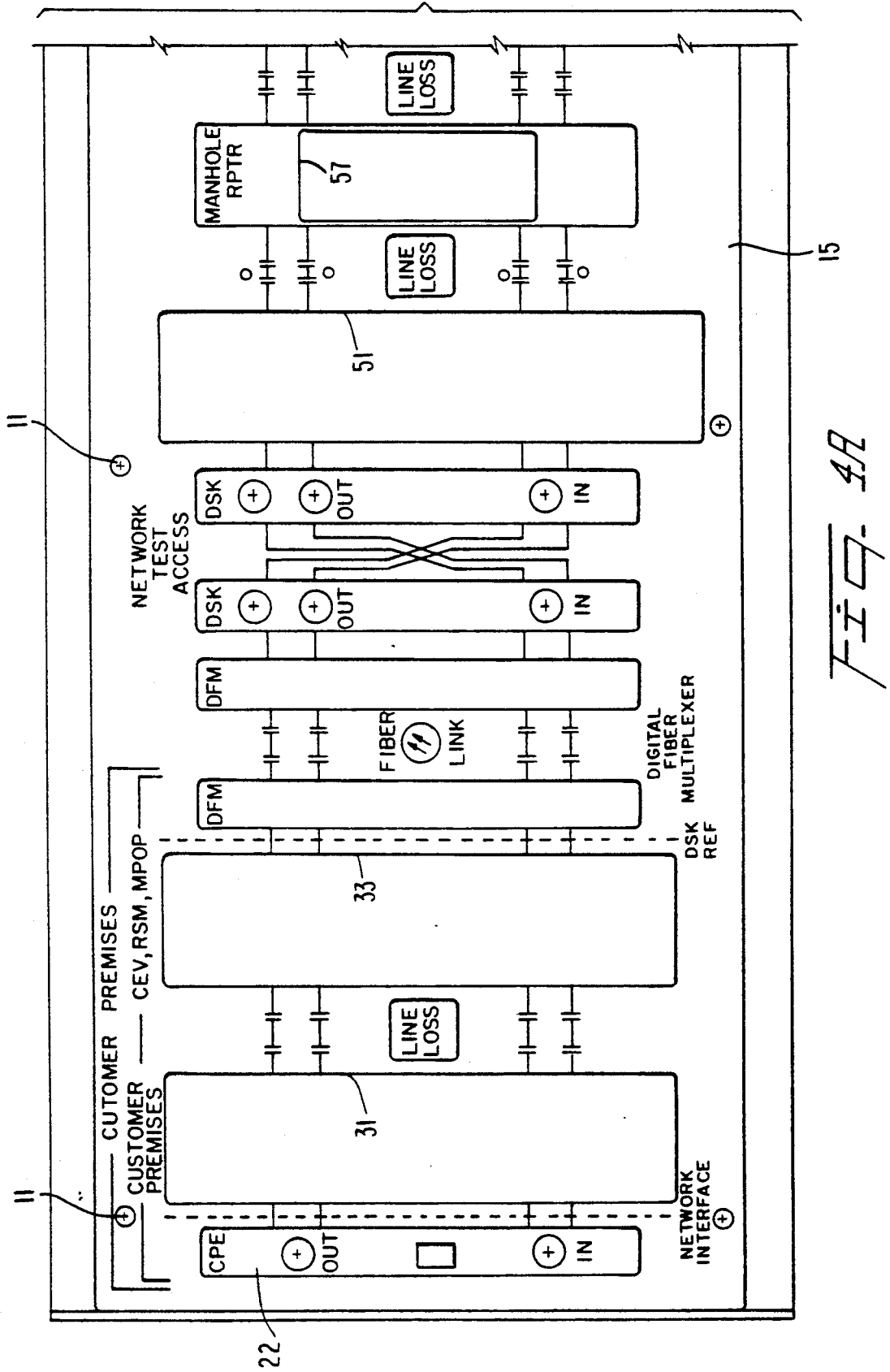

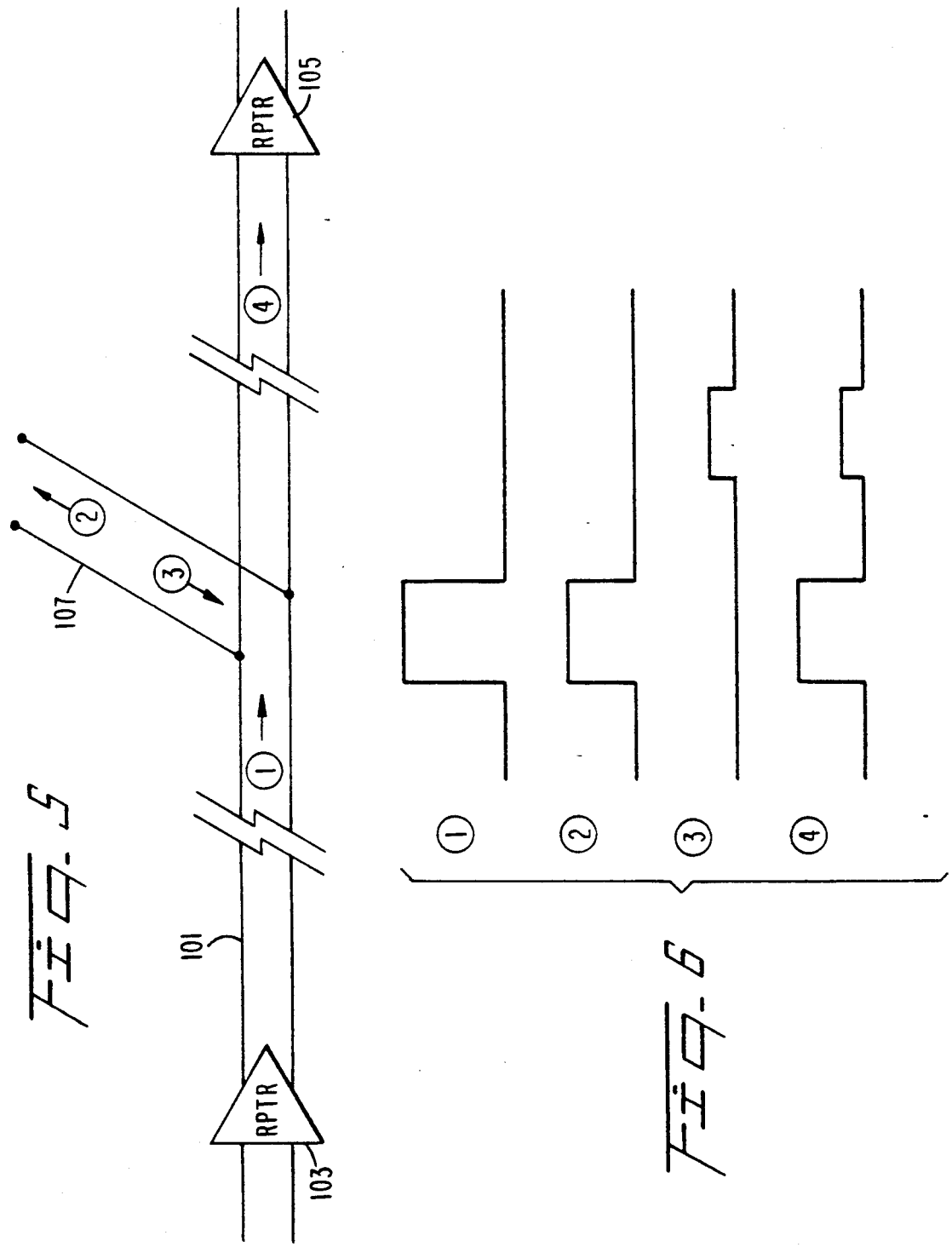

T-CARRIER NETWORK SIMULATOR

TECHNICAL FIELD

This invention relates generally to the field of telecommunications and more particularly to a device for simulating a T-Carrier network.

BACKGROUND ART

The telecommunications system provided in the United States and throughout the world was initially designed to transmit voice signals over high capacity transmission links, such as optical fiber, coaxial cable, and microwave. Part of the evolution of these telecommunications networks to digital technology has been the adoption of synchronous TDM transmission structures. This has led to the development of a hierarchy of TDM structures of varying capacities. The basis of the TDM hierarchy in the United States is the DS1 transmission format which multiplexes 24 channels. Each frame contains 8 bits per channel plus a framing bit or 193 bits. For voice transmission each channel contains one word of digitized voice data and the original analog voice signal is digitized using pulse code modulation (PCM) at a rate of 8,000 samples per second. Thus each channel slot and hence each frame repeats 8,000 times per second to produce a data rate of 1.544 Mbps. The same DS1 format is used to provide digital data service at the same 1.544 Mbps. data rate. The DS1 format can also be used to carry a mixture of voice and data channels.

The basic digital transmission facility is a T-1 line, which consists of an office repeater at each end feeding twisted pair wire, with digital regenerators or repeaters spaced every 6,000 feet. The function of the office repeater is to match the output of the office terminal equipment to the impedance of the line and to feed power over the line to the repeaters. The line repeaters regenerate the incoming pulses to eliminate distortion caused by the cable.

T-1 signals are kept in synchronization by loop timing in which synchronizing pulses are extracted from the incoming bit stream. The PCM output of a channel bank is encoded in bipolar format and the transition of each "1" bit is detected by the repeaters and the receiving terminals and used to keep the system in synchronization. T-1 carrier lines can be extended for about 200 miles, although most private and common carrier applications are considerably shorter because longer circuits are usually deployed over radio or fiber optic facilities.

Companies who either provide DS1 (1.544 Mbps) services or use them extensively require an economical, comprehensive method to train employees who perform DS1 testing. Telephone companies generally perform DS1 training either in a classroom environment or in the field. In the classroom, much of the training is theoretical in nature. In many cases, expensive lab equipment is available but provides only a limited range of DS1 testing scenarios. In the field, testing can be taught using actual DS1 circuits but there is limited control over test conditions.

SUMMARY OF THE INVENTION

It is accordingly an object of the present invention to provide an improved arrangement to train technicians to perform DS1 maintenance and testing.

It is another object of the invention to provide a portable, self-contained device which faithfully represents a DS1 circuit from one customer premise facility through a central office to another customer premise facility.

It is yet another object of the invention to provide such a portable self-contained training device which simulates both fiber and wire connecting links including below-ground links.

It is still another object of the present invention to provide a DS1 simulator which includes actual network modules which may be tested in circuit but which may be replaced with substitute modules of the same or competitive manufacturers and with faulty or impaired modules.

It is another object of the invention to provide a portable DS1 simulator which may be set up to simulate actual working T1 spans from customer premise to and through a central office to customer premise to permit training in sophisticated methods of isolating equipment and facility faults.

It is another object of the invention to provide a portable DS1 simulator which may be set up to simulate specific impairments at predetermined positions in the span including impairments in actual network equipment in the span as well as impairments in the span itself.

It is another object of the invention to provide a DS1 simulator having a front panel bearing a diagram of the simulated network while providing accessible slots for actual network elements.

It is yet another object of the invention to provide a DS1 simulator for training of engineering, repair, installation, and maintenance personnel which is compatible with telephone company standard test equipment and test procedures.

It is another object of the invention to, provide a T-Carrier network simulator apparatus which includes a first customer premise simulation, a first T-Carrier link simulation, a switching office, repeater hut or controlled environmental vault simulation, a second T-Carrier link simulation, a second customer premise simulation, and a power connection, wherein units of the apparatus are provided in modular form removably mounted in a portable housing and wherein the T-Carrier simulations include fiber and wire link simulations.

These and further objects and advantages of the invention will be apparent from the following specification, claims and drawings.

BRIEF DESCRIPTION OF DRAWINGS

FIG. 3 is a block diagram illustrating the connection and arrangement of the multiple units or elements of the simulator of the invention;

FIGS. 4A and 4B show a front elevation view of the front panel of the simulator of FIG. 3 illustrating the diagram appearing on the front panels of the modules;

FIG. 5 is an illustration of a bridge tap on a line;

FIG. 6 is an illustration of the effect of a bridge tap on a pulse;

BEST MODE FOR CARRYING OUT THE INVENTION

Figure 1:
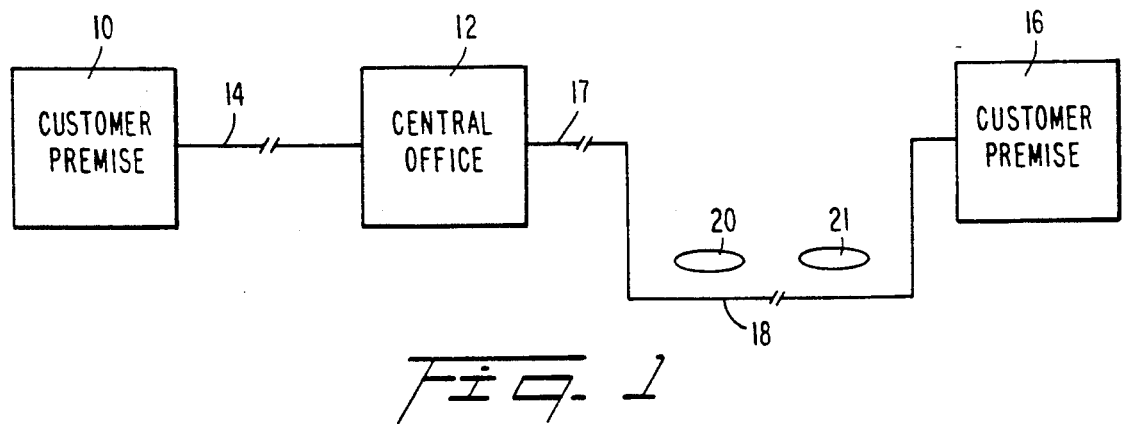
FIG. 1 is a diagrammatic illustration of a DS1 network which may be simulated by the simulator of the invention.

Referring to FIG. 1 there is shown a DS1 telecommunication network comprising a first customer premise (CP) installation 10 which may house a CSU and PBX, multiplexer or other devices along with other customer facility equipment. This CP installation is connected to a central switching office (CO), repeater hut or controlled environmental vault (CEV) 12 through a fiber link 14. The central switching office 12 is connected to a second customer premise installation 16 and its equipment through a wire link which is at least partly above ground as at 17 and partly underground as indicated at 18. The underground portion may be accessed through one or more manholes indicated diagrammatically at 20 and 21.

Referring to FIG. 3 there are illustrated the units which may comprise a simulation of the network of FIG. 1 in the simulator of the invention. In FIG. 3 the first customer premise is indicated at 10, the fiber link is indicated at 14, the central switching office is indicated at 12, the wire link is indicated at 17 and 18 and the second customer premise is indicated at 16.

According to the invention the first customer premise 10 is comprised of a CP jack unit or module 22 having CP OUT and IN jacks 24 and 25 mounted on the face of the panel to be described. These could be 310, 309 or bantam size jacks. Also mounted on the panel representing module 22 may be an RJ48 jack 27. The RJ48 jack has four connector terminals parallelled with the tip and ring connections of the jacks 24 and 25. The CP OUT and IN jacks 24 and 25 and the RJ48 jack 27 are mounted on the front panel 15 of the simulator illustrated diagrammatically in FIG. 2 and illustrated in detail in FIG. 4. The module 22 is indicated by the rectangle bearing that number in FIG. 4. This rectangle forms a part of the representation of the circuitry of the simulator which is applied to the front of the panel 15 by silk screen or the like process.

Figure 2:
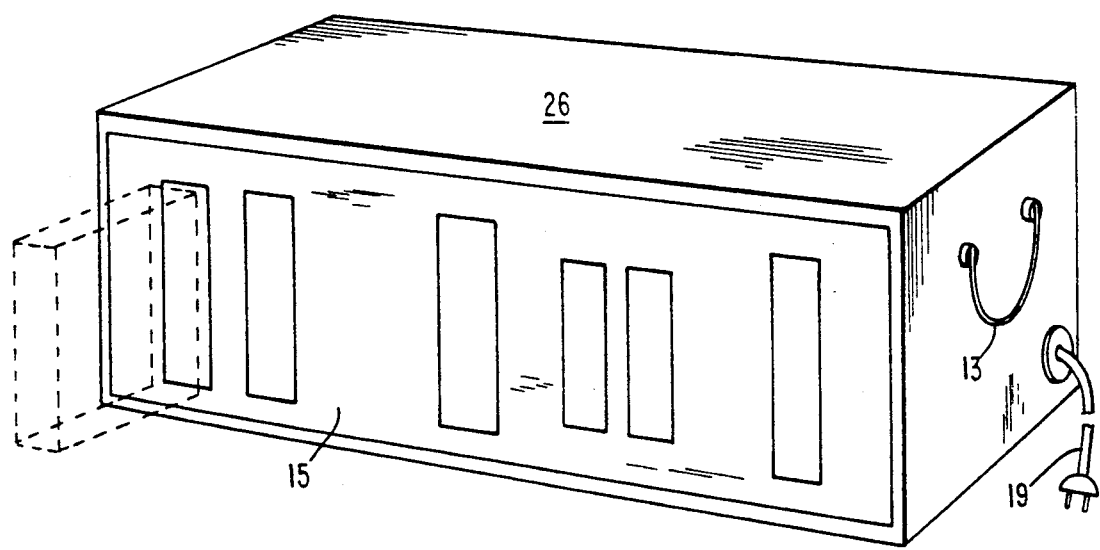
FIG. 2 is a diagrammatic perspective illustration of the housing and general arrangement for a DS1 simulator constructed according to the invention.

Referring to FIG. 2 the simulator of the invention is illustrated housed in a container or enclosure 26 which is provided with carrying handles 13. The front panel 15 is secured on the face of the enclosure 26 in any suitable removable fashion such as by screws 11 seen in FIG. 4. Line power to the portable unit is provided by any suitable line cord such as indicated at 19 in FIG. 2.

Referring to FIG. 3 the CP jacks 24 and 25 and RJ48 jack 27 are connected to a smart jack 29.

The typical smart jack provides signal loop-back, line or local powering looping of the telephone company simplex power, and isolates and terminates a telephone company T1 span line on customer premises. Loop-back, transmit and receive line monitor jacks 28 and 30, and a loop-back switch 32 may be located on the front panel. Loop back control may be local, as through manual operation of the switch or may be remote. It will be understood that the drawing of the jacks and switch is representative only and is not intended to illustrate all front panel connection points or switches conventionally provided on commercial smart jacks. The smart jack module 29 in the simulator is an actual commercial network module and it will be understood that other jacks and switches may be provided on the front panel depending upon the particular brand and model of jack which is used. Illustrative examples are the Larus Model LA103e and the various Westell models. Line or local power may ordinarily be used. An internal power supply may also be provided. It is not intended that the simulator will be connected to an operating network.

Connected to the smart jack 29 through the backplane wiring is a line build out attenuator or pad 34 which may provide fixed or variable attenuation. Variable attenuation may be controlled by means of a selector switch 36. Attenuator 34 represents distance electrically between the CPE line side and CPE equipment side of the CPE-line interface.

The smart jack module comprises an actual network component and had a conventional front panel with one or more rearwardly extending circuit boards carrying rear plug-in type terminal connectors for mounting in standard backplane hardware. The module is mounted in a 400 type mechanics mounting provided in the enclosure or cabinet 26. An opening 31 is provided in the front panel 15 through which the smart jack may be slidably inserted and connected to the backplane connector hardware. The CP jacks 24 and 25 and the RJ48 jack 27 are connected to the smart jack through the backplane wiring. The CP jacks and RJ48 jack permit connection of test equipment as well as connection of typical customer load components such as CSU, MUX, PBX, etc.

Figure 4B:
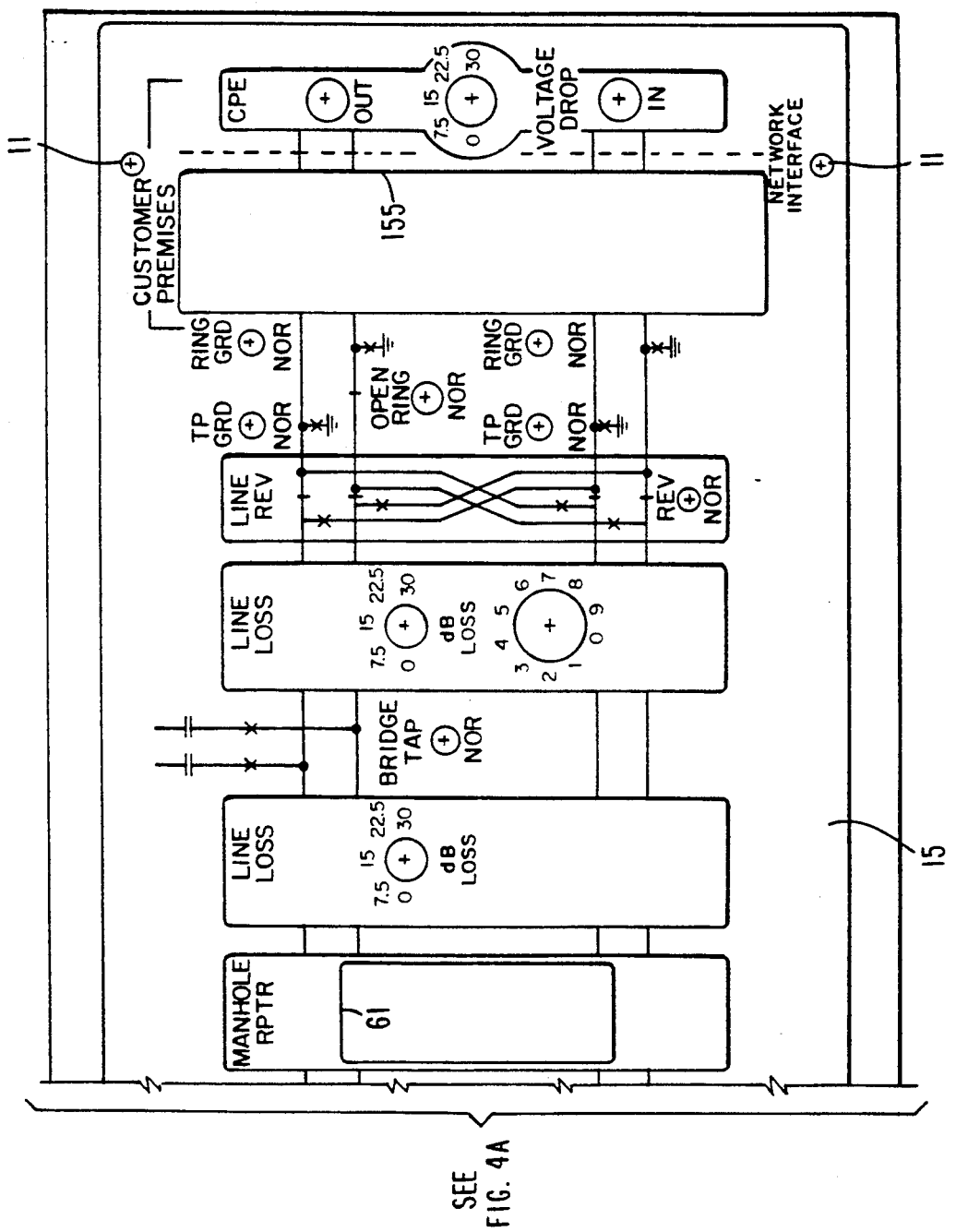

The attenuation in attenuator 34 is illustrated on the front panel in FIG. 4 by the broken line connections to the smart jack in the opening 31. Between those broken line connections there is shown a block bearing the legend "line loss". In this instance the line loss is fixed and there is no variable control on the front panel of the unit. In this embodiment illustrated in FIG. 4 the attenuator 34 is not a removable module.

Referring to FIG. 4, attenuator 34 is connected to a line extension repeater 38 which is also an actual network component using 400 mechanics. The repeater provides impedance matching and provides any regeneration which is desirable following the attenuation in attenuator 34. The repeater also may incorporate addressable loop back which is provided in a Westell extension repeater by way of example. As stated, the repeater 38 is an actual network unit and is provided with front panel monitor jacks 40 and may be provided with test points for span current and voltage, loop-back and other switches and indicator lights (not shown). The repeater may be span powered or self-powered from the line source provided to the portable device. Repeater 34 is mounted in the opening 33 in front panel 15 as shown in FIG. 4.

The repeater 38 feeds one termination DFM of digital fiber multiplexer (DFM) 42 of a simulated fiber optic link generally indicated at 14. DFM 44 provides the other termination of the fiber optic link. The fiber optic link comprises the terminations 42 and 44 and the module 46 which collectively provide an electronic simulation of the fiber link 14 in FIG. 1. This is illustrated on the front panel in FIG. 4 by broken lines and a circular symbol labeled Fiber Link. Except for special applications, the digital signal input of fiber optic systems is designed to interface Bell or CCITT digital signals. While the output signal is determined by the manufacturer it is retranslated back to Bell or CCITT standards by the interface. The Bell specifications include Bell Communications Research CB119, CB135 MX3/FT3, PUB 43806 and related specifications. The basic characteristics of such links are well known and include by way of example removal of bipolar violations and passage of a line code AMI and the standard test codes. Thus a basic simulator may comprise a smart jack with a bipolar violation eliminator and optical decoupling or isolation between the input and output terminations.

From the fiber link termination DFM 44 there commences the central switching office, CEV or the like 12 which contains a conventional digital signal cross-connect (DSX) module 47 and office repeater module 50. The transmit and receive circuits of the DSX1 are wired through jacks in the front panel 15 of the enclosure to provide test access, patching, rearranging circuits and manually transferring to a spare line in case of failure. In and out monitor jacks 48, 49, 51 and 53 are provided.

The output of the DSX 47 is connected to the station repeater 50 which is generally similar to the CP repeater 38. Monitor jacks 52 and other test jacks and control switches (not shown) are provided. The repeater 50 is an actual network unit and is received in opening 51 in the front panel 15 using standard 200 mechanics. Addressable loop back may be provided.

The signal from repeater 50 represents the signal leaving the central office, CEV, etc. via wire transmission facilities 17 in FIG. 1. The wire line simulation commences with attenuator 54 which simulates line loss. Attenuator 54 may be fixed or variable. This is followed by a first actual network manhole repeater module 56. This repeater is provided with monitor jacks 58 and other conventional test jacks, control switches and indicator lights (not shown). As with the repeaters 38 and 50 addressable loop back may be provided. The manhole repeater 56 may be regarded as associated with the first manhole 20 in FIG. 1. The manhole repeater 56 is an actual network unit and is received in opening 57 in the front panel 15 using standard 200 mechanics.

A second manhole repeater 55 is connected to the first manhole repeater 56 through a fixed attenuator 59 representing the line loss shown as broken lines and a line loss square on the front panel as represented in FIG. 4. Both repeaters are actual network units with the second manhole repeater being inserted in a front panel slot 61 for mounting using standard 200 mechanics. The second manhole repeater 55 is provided with monitor jacks 63 for the IN and OUR lines. The second manhole repeater may be considered to be mounted at the second manhole 21 in FIG. 1. Manholes 20 and 21 are separated by a length of wire line represented by the attenuator 59. The second manhole repeater is also provided with loop back and may possess addressable loop back.

It will be understood that in network practice feeder cables and distribution cables are designed to avoid bridge tap to the greatest degree possible. Bridge tap may be defined as any portion of the cable pair that is not in the direct path between the user and the central office. It generally has the electrical effect of a capacitor across the pair and impairs the high frequency response of the circuit. Bridge tap can create distortion which may render DTMF signals and data modems inoperative.

A controllable simulation of a bridge tap is provided through a variable attenuator 65, bridge tap switching unit 60 and variable attenuator 67. The variable attenuators 65 and 67 may be provided with controls 69 and 71 to provide stepped attenuation between 0 and 30 db. by way of example. The attenuator 67 may also be provided with a variable resistance network for simulating additional line voltage drops representing DC loss. This may be variable and controlled by a knob 73. The bridge tap module 60 is provided with a suitable switch 75 for connecting and disconnecting the simulated bridge tap as illustrated by the circuit on the front panel shown in FIG. 4. Thus a capacitive and LCR network may be connected and disconnected to the OUT line to apply or remove the bridge tap. A monitor connector 77 provides test access to the point of bridge tap connection.

When the bridge tap is connected it's position on the line may be varied by increasing and decreasing the attenuation provided in attenuators 65 and 67. For example, the first attenuator 65 may be set for 0 attenuation and the second attenuator 67 may be set for maximum attenuation which would have the simulated effect of placing the bridge tap at the manhole repeater 55. With increase of one attenuator and decrease of the other attenuator any position between the manhole repeater 55 and following customer premises may be simulated. In addition to the foregoing, the length of the bridge tap may be simulated to variation in the LCR filter network through a control 77. While the front panel diagram illustrated in FIG. 4 shows the bridge tap lines extending away from the OUT span in actuality the LCR unit is preferably included within the bridge tap module 60.

Referring to FIGS. 5 and 6 the effect of bridge tap is illustrated. In FIG. 5 there is shown a transmission line or loop 101 extending between a pair of repeaters 103 and 105. The transmission line 101 may be considered the OUT line in FIG. 3 extending between the manhole repeater 55 and the customer premises equipment at 16. Referring to FIG. 6 there is shown at 1 a pulse traveling toward the bridge tap 107 as indicated by the circled numeral 1 and arrow in FIG. 5. This pulse travels outwardly along the bridge tap 107 in the direction of the circled numeral 2 and arrow. The pulse is attenuated in an amount depending upon the length of the bridge tap as shown in FIG. 6 by the numeral 2. If the bridge tap is open there is a reflection of the pulse 2 as indicated by the numeral 3 in FIG. 6 and by the numeral 3 and arrow in FIG. 5. The reflected signal is combined with the original pulse and appears on the OUT side of the bridge tap at the position indicated by the circled numeral 4 and arrow in FIG. 5 in the form illustrated by the numeral 4 in FIG. 6. Thus there is an attenuated original pulse in addition to the reflected smaller pulse.

Figure 7:
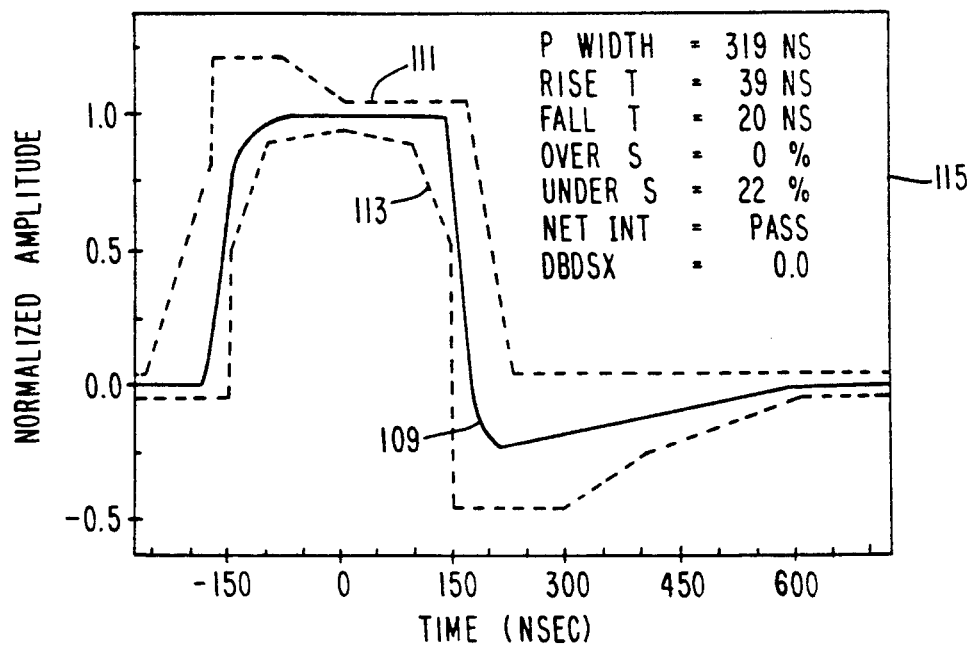
FIG. 7 is a depiction of an actual test pulse on a CRT of a tester showing the pulse masks and data printout.

With the unit of this invention it is possible to observe this condition by connection of a test instrument to the DS1 simulator at the test and monitor points provided. Thus, for example, a conventional test instrument, such as a T-Berd 209 may be connected at the OUT line monitor jack of the manhole repeater 55 to show a pulse as indicated by the solid line in FIG. 7. As will be understood by those skilled in the art the test instrument provides an acceptability mask indicated by the dotted lines 111 and 113 with a printout as to the characteristics of the pulse at 115.

Figure 8:
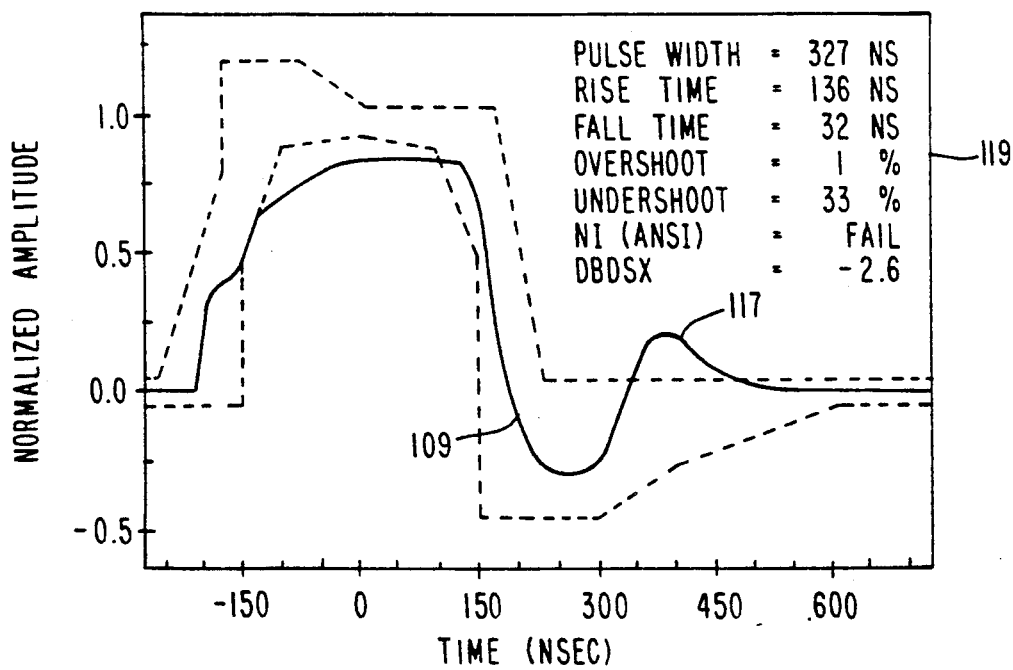
FIG. 8 is a depiction of the effect of a bridge tap on the pulse of FIG. 7.

Referring to FIG. 8 there is shown the effect of the bridge tap previously described in connection with FIGS. 5 and 6. The original pulse 109 is distorted and attenuated by the bridge tap and has added thereto the reflection pulse 117. As will be seen the boundaries of the mask have been violated. Again, the test data is provided at 119. The test instrument may be connected at the line reversal module 70 whose circuitry is indicated on the front panel of the unit. Monitor jacks are provided at 121 and 123. The shape of the output pulse signal following the bridge tap is dependent upon the loading of the bridge tap 107 in FIG. 5 and the position of the bridge tap which may be observed at various points along the simulated DS1 T-carrier link and varied by the controls of the unit for training and other purposes. In addition to the foregoing test illustrated in FIGS. 5-8 it is possible to demonstrate the effect of the bridge tap on the signal transmitted when all types of stress tests are applied. It will be realized that this constitutes valuable information particularly for training purposes.

The line reversal unit 70 is connected to an open ring and ground simulator module 72 having tip and ring OUT line ground switches 125 and 127, open ring switch 129 and tip ground and ring ground monitor connections 131 and 133. The circuit for these switches and connections is indicated in the front panel depiction of the circuitry in FIG. 4. An open ring monitor connection is provided at 135. IN line ground switches are provided at 137 and 139 and tip ground and ring ground monitor connections are provided at 141 and 143. The circuitry is illustrated on the front panel illustration of FIG. 4.

It will be seen that the effects of open ring may be created and observed as well as the effect of grounding of any one or more of the tip or ring lines in either the OUT or IN transmission link.

The switching unit 72 terminates the simulation of the wire link spans 17 and 18 of FIGS. 1 and 3. This is followed by the second customer premise station indicated at 16. This customer premise is provided with a smart jack 84 which is an actual network module which may be similar to the module 29 in the first customer premises. The smart jack 84 may be provided with a switch 145 and connections 147 and 149 corresponding to the connections to the smart jack 29 in the first customer premises.

The smart jack 84 is connected to CP connector unit 86 having IN and OUT jacks 90 and 91 and an RJ48 connector 151. A voltage drop control resistor may be provided as indicated at 153 to provide variable drop in the DC voltage between the smart jack 84 and the output test terminals.

The smart jack 84 is an actual network unit and is received in an opening 155 in front panel 15. The connector module 86 is mounted on the front panel. A CSU or other customer premise load may be connected to the output connection 86. The control 153 may be varied to demonstrate the effect of customer loading.

In the preferred embodiment of the invention a depiction of the circuit and/or module functions is silk screened or otherwise reproduced on the faces of the various modules. This provides marked simplification for trainees and facilitates not only understanding of the system but also a quick location of the desired module. An example of such a depiction is illustrated in FIG. 4. It will be understood that the invention is not limited to the specific modules described nor to the specific number of modules and that other arrangements of modules may be used.

The operation of the device is now described.

Generally speaking telecommunications network testing has two objectives:

1. To measure operating variables that have been designed into the network, to confirm that design objectives have been achieved, and to field test new units in the network.

2. To locate faulty network elements by sectionalizing and isolating defective items of equipment.

The first category of tests is usually called acceptance or proof of performance tests. These are conducted to establish a data base that can later be the basis for fault locating tests or field proving new units. The second category of tests usually does not require the depth and sophistication of the former but presents a large variety of problems of a different nature. With today's networks, testing is complicated by numerous factors including the following:.

Network elements are obtained from multiple vendors and frequently present incompatibility problems.

Trouble must be sectionalized by testing to interfaces between vendors.

The responsibility for impairments such as high noise and data errors is often unclear, and vendors are not quick to claim responsibility.

Incompatibility at interfaces may arise under some conditions, and lacking interface standards, the user must be left to negotiate the solution between vendors.

A common problem for all types of circuit tests is how to obtain test access to the circuit. Access is obtained by one of three methods:

Manual access through jacks, test points, or distributing frames;

Switched access;

Permanently wired test equipment.

The DS1 simulator of the present invention provides a unique tool for demonstrating and instructing with respect to all of the foregoing test methods.

Illustrative of the tests and demonstrations that may be performed with the simulator of the invention are the following:

Assuming an actual network testing situation, if both technicians at customer facilities 10 and 16 are available, they may individually pulse the interoffice facility 12 and each may test his/her respective smart jacks 29 and 84. Alternately a technician at the CO location may pulse and test the smart jacks. With the two technician test the technician at customer facility 10 may test through to customer facility 16 smart jack 84 and the technician at customer facility 16 may test through to customer facility 10 smart jack 29. This procedure verifies DSX 47 cross-connect continuity.

If only one of the technicians is available, that technician must first loop the smart jacks at both stations and then run a "round robin" test from the DSX 47 to determine cross-connection continuity. The "round robin" test involves sending a signal at the "in" jack of the DSX location, letting it loop through both smart jacks and reading it at the "out" jack of the other DSX location. The foregoing constitute actual network testing procedures. This "round robin" test and numerous variations thereof may be readily demonstrated in a "table top" manner with the simulator of the invention for education and training purposes. For example:

The loop-back condition may be established by remote control from the CO. A conventional test set having send and receive terminals such as, for example, a T-Berd 209A, may be set up with its send terminal connected to "in" connection 48 and its receive terminal connected to "out" connection 51 in DSX 47. Any direct interconnect between these two points 48 and 51 has been previously removed and a connection between terminals 49 and 53 has been established.

The test set may now be used to transmit a signal into in-connection 48 to proceed through DFM 44, fiber link 46, DFM 42, repeater 38, attenuator 34, to looped smart jack 29 for loop-back through that smart jack (or optionally through a looped CSU if added), attenuator 34, repeater 38, DFM 42, fiber link 46, DFM 44, DSX 47, repeater 50, attenuator 54, manhole repeater 56, attenuator 59, bridge tap attenuator 65, bridge tap unit 60, bridge tap attenuator 67, line reversal 70, open ring/short simulator 72, and looped smart jack 84 (or optionally through a looped CSU if provided) back through that smart jack to open ring/short simulator 72, line reversal 70, bridge tap attenuator 67, bridge tap simulator 60, bridge tap attenuator 65, second manhole repeater 55, attenuator 59, first manhole repeater 56, attenuator 54, repeater 50 and connection 51 back to the receive terminal on the test set.

As the final step in the "round robin" test, a connection between in-out terminals 48 and 51 may be established and a connection between out-in terminals 49 and 53 may be broken. The test set is then connected to terminals 49-53 with the test set send terminal connected to in-connector 53 and receive terminal connected to out-terminal 49. The "round robin" may then be performed in the opposite direction. Thus a signal from the send terminal of the test set enters DSX in-terminal 53 and passes sequentially through repeater 50, attenuator 54, first manhole repeater 56, attenuator 59, second manhole repeater 55, bridge tap attenuator 65, bridge tap unit 60, bridge tap attenuator 67, line reversal 70, open ring/short simulator 72, to looped smart jack 84, where the signal is looped back to open ring/short simulator 72, line reversal 70, bridge tap attenuator 67, bridge tap simulator 60, bridge tap attenuator 65, second manhole repeater 55, attenuator 59, first manhole repeater 56, attenuator 54, repeater 50, DSX terminals 51-48, DFM 44, fiber link simulator 46, DFM 42, repeater 38, attenuator 34, to looped smart jack 29, where it is looped back through attenuator 34, repeater 38, DFM 42, fiber link simulator 46, DFM 44 and out terminal 49 of DSX 47 to the receive terminal of the test set which originated the signal.

It will be obvious that many variations of this test procedure are possible. Also the effect of numerous variables can be demonstrated such as variation in the setting of any of the attenuators 34, 54, 59, 65 and/or 67, actuation of the open ring simulation or any of the short simulations. At the same time it is possible to provide signal indications and levels at any of the monitor jacks in the circuit.

In other demonstration and testing procedures test sets may be connected at either or both ends of the network such as CPE jacks 22, 24-25, RJ48 and 90, 91 or RJ48 and the effect of adjustment of the various variables observed.

The foregoing and still additional tests may be conducted using conventional Quasi-Random Signal (QRS) patterns currently employed in establishing DS1 services as well as any of the currently used stress tests. The DS1 simulator of the invention makes it possible to very conveniently demonstrate to trainees the different defects which ma be detected utilizing such stress tests.

Certain standard testing is performed at the network interface at the CP jacks in unit 22 and other standard tests are made at the DS1 interface. There are ANCI and CCITT requirements of the pulse configuration at both official locations and this may be demonstrated or observed on suitable test units at these interfaces to determine whether or not the appropriate masks (as in FIGS. 7 and 8) are being satisfied or violated.

Another capability of the DS1 simulator of the invention is to permit the development of test patterns. By way of example it is possible to use the DS1 simulator to create an impairment and then run a series of different test patterns to determine a pattern which will most readily locate that impairment.

The simulator makes possible the test of new equipment and competitive devices. For example, it is possible to connect a test set at the DSX, put an address in and bring up any repeater having an addressable loop back capability. The same is true with respect to a CSU having such capability. In the manhole repeaters 55 and 56 it is possible to use Lynch or AT&T repeaters currently available which do not have addressable loop backs. The effect of changeover to equipment having addressable loop back may be demonstrated. If the manhole repeaters are addressable loop back type it is then feasible to loop back either one or the other repeater from the DSX. Another important aspect of the invention is the possibility of inserting actual network units having known impairments or faults. It is possible to insert a faulty unit and have the trainee conduct tests to locate the unit. In addition the DS1 simulator can be used to compare competitive units and also may be used to test compatibility.

Another feature of the invention is that it permits a technician to remove a smart jack, insert a 400 mechanics extender, and engage in DC testing on the cable pair. For example, it would be possible to use an extender in the slot for the central office repeater 50 and test all the way out to the customer location with a conventional test set. The same can be done from the manhole repeaters. In such DC testing it is possible to vary the DC resistance through control 73 in attenuator 67 thereby changing the DC length of the line. Extenders may also be used with the smart jacks and this is illustrated in phantom in FIG. 2. At the same time it is possible to insert grounds at the switching unit 72. With such DC testing it is possible to determine whether or not a pair is qualified for DS1 transmission. This is accomplished by standard 113 tests. The use of extenders with the DS1 simulator of the invention permits basic testing for grounds and opens using voltmeters and the like.

Another feature of the invention permits detection, observation and demonstration of phase jitter. It is known that some repeaters have more phase jitter than others. This can be readily demonstrated using a conventional test unit such as the T-Berd. With the unit it is possible to demonstrate that with a smart jack having significant phase jitter and with maximum simulated cable length from a DC standpoint as controlled by resistance control 73, a low quality CSU which is span powered will fail because of the phase jitter.

Another demonstration and test that can be made with the unit is the testing of timing slips. This can be accomplished by providing external clocking. By taking one clock from one test set and another clock from another test set it is possible to emulate timing slips. Also by using a smart jack clocked externally and another smart jack clocked from another external source it is possible to create an impairment or create timing slips.

Still other objects and advantages of the present invention will become readily apparent to those skilled in the art from the foregoing description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

I claim:

1. A T-carrier network simulator apparatus comprising in combination:
   first customer premise simulation means;
   first T-carrier link simulation means;
   switching office simulation means;
   second T-carrier link simulation means;
   second customer premise simulation means;
   power supply means;
   said simulation means being comprised of electrically connected modules mounted in portable housing means having front panel means, at least certain of the components of said above listed means being removably mounted to permit front panel removal thereof; one of said T-carrier links comprising fiber link simulation means between wire terminations which provide conductive isolation and bipolar violation removal between the wire terminations.

2. A T-carrier network simulator apparatus according to claim 1 wherein at least one of said customer premise simulation means includes at least one actual network interface module accessible from and replaceable from said front panel means.

3. A T-carrier network simulator apparatus according to claim 1 wherein said switching office simulation means includes an actual network office repeater accessible from and replaceable from said front panel means.

4. A T-carrier network simulator apparatus according to claim 1 wherein at least one of said T-carrier link simulation means includes bridge tap simulation means, said bridge tap simulation means including impedance control means accessible from said front panel means to simulate variation in the effect of position of a bridge tap.

5. A T-carrier network simulator apparatus according to claim 1 wherein at least one of said T-carrier link simulation means includes separately adjustable attenuation means accessible from said front panel means to vary signal attenuation and DC resistance.

6. A T-carrier network simulator apparatus according to claim 1 wherein the other T-carrier link simulation means comprises wire T-carrier link simulation means.

7. A T-carrier network simulator apparatus according to claim 6 wherein said wire T-carrier link simulation means includes means for simulating an open ring connection to said second customer premise simulation means.

8. A T-carrier network simulator apparatus according to claim 7 wherein said apparatus includes test points accessible from the front panel means and also includes means for providing signal loop-back on both sides of said test points wherein said loop back is subject to both remote and local control.

9. A T-carrier network simulator apparatus according to claim 1 including a diagrammatic depiction of the network and components therein reproduced on said front panel means.

10. A T-carrier network simulator apparatus according to claim 1 including at least one actual network smart jack and/or repeater means removably mounted to permit front panel removal thereof, and extender means compatible with said smart jack or repeater means for extendably mounting said smart jack or repeater means to said simulator apparatus to provide DC line testing capabilities.

11. A T-carrier network simulator apparatus according to claim 10 including a second actual network smart jack means and/or repeater removably mounted to permit front panel removal thereof and extender means compatible with said second smart jack or repeater means for extendably mounting said second smart jack or repeater means to said simulator apparatus.

12. A T-carrier network simulator apparatus according to claim 1 including means for impairing the operation of one or more portions of said simulator apparatus in simulation of the impairment of a T-carrier network being simulated.

13. A T-carrier network simulator apparatus according to claim 12 wherein one of said impairments includes creation of phase jitter.

14. A T-carrier network simulator apparatus according to claim 1 capable of providing bi-directional round robin testing of said simulated network.

15. A T-carrier network simulator apparatus according to claim 1 including multiple smart jack means and multiple repeater means and digital signal cross connect (DSX) means.

16. A T-carrier network simulator apparatus according to claim 15 capable of providing bi-directional round robin testing of said simulated network through said DSC means.

17. A portable self-contained T-carrier network simulator apparatus having in electrical interconnection in a portable housing means:
   first customer premist simulation means including actual network smart jack means and repeater means;
   first T-carrier link simulation means having terminations and providing conductive isolation between said terminations and bipolar violation removal;
   switching office simulation means and network digital signal cross-connect frame (DSX) and repeater means;
   second T-carrier link simulation means comprising wire T-carrier link simulation means including actual network component manhole repeater means and line reversal means and also including bridge tap simulation means having control means accessible from front panel means to simulate variation in the position of a bridge tap; and
   second customer premise simulation means including actual network smart jack means and customer premise (CP) jack means.

18. A T-carrier network simulator apparatus according to claim 17 wherein said actual network means comprise modules accessible from and replaceable from said front panel means to permit interchange with the same or different modules.

19. A T-carrier network simulator apparatus according to claim 17 wherein said apparatus includes test points accessible from the front panel means and also includes means for providing signal loop-back on both sides of said test points wherein said loop-back is subject to both remote and local control from said test point.

20. A T-carrier network simulator apparatus according to claim 17 including a diagrammatic depiction of the network and components thereof reproduced on said front panel means.

* * * * *